United States Patent [19]
Schultz

[11] Patent Number: 6,036,093
[45] Date of Patent: Mar. 14, 2000

[54] MODULAR SCANNER WITH HAND-HELD DATA TERMINAL

[75] Inventor: Darald R. Schultz, Cedar Rapids, Iowa

[73] Assignee: Intermec IP Corp., Woodland Hills, Calif.

[21] Appl. No.: 09/081,471

[22] Filed: May 19, 1998

Related U.S. Application Data

[63] Continuation of application No. 08/772,537, Dec. 24, 1996, abandoned, which is a continuation of application No. 08/449,630, May 24, 1995, Pat. No. 5,587,577, which is a continuation of application No. 08/195,154, Feb. 10, 1994, abandoned, which is a continuation-in-part of application No. 07/872,717, Apr. 23, 1992, Pat. No. 5,305,181.

[51] Int. Cl.[7] ........................................................ G06K 7/10
[52] U.S. Cl. ................................ 235/462.44; 235/462.43; 235/462.47
[58] Field of Search ........................... 235/462.43, 462.44, 235/462.45, 462.47; 361/680, 681

[56] References Cited

U.S. PATENT DOCUMENTS

| | | |
|---|---|---|
| 3,978,318 | 8/1976 | Romeo et al. .................. 235/462.45 X |
| 4,261,042 | 4/1981 | Ishiwatari et al. . |
| 4,387,297 | 6/1983 | Swartz et al. . |
| 4,766,299 | 8/1988 | Tierney et al. . |
| 4,930,848 | 6/1990 | Knowles . |
| 4,983,818 | 1/1991 | Knowles . |
| 5,115,120 | 5/1992 | Eastman . |
| 5,191,197 | 3/1993 | Metlitsky et al. .................. 235/462.44 |
| 5,202,817 | 4/1993 | Koenck et al. . |
| 5,212,372 | 5/1993 | Quick et al. . |
| 5,250,790 | 10/1993 | Melitsky et al. . |
| 5,272,324 | 12/1993 | Blevins ............................... 235/462.44 |
| 5,294,782 | 3/1994 | Kumar . |
| 5,305,181 | 4/1994 | Schultz .................................... 361/680 |
| 5,340,972 | 8/1994 | Sandor . |
| 5,410,140 | 4/1995 | Bard et al. .......................... 235/462.44 |
| 5,514,861 | 5/1996 | Swartz et al. . |
| 5,578,810 | 11/1996 | Bard et al. . |
| 5,587,577 | 12/1996 | Schultz . |

FOREIGN PATENT DOCUMENTS

| | | |
|---|---|---|
| 204056 | 10/1985 | Japan . |
| 3-226887 | 10/1991 | Japan . |
| 4-233089 | 8/1992 | Japan . |
| 579798 | 9/1976 | Switzerland . |

OTHER PUBLICATIONS

Ludeman et al., Wrist Worn Terminal, IBM Technical Disclosure Bulletin, vol. 15, No. 11, Apr. 1973, pp. 3350–3351.

*Primary Examiner*—Karl D. Frech
*Attorney, Agent, or Firm*—Simmons, Perrine, Albright & Ellwood

[57] ABSTRACT

A hand held body for receiving, storing and transmitting information having a keyboard in the top thereof for manually entering information therein. A display is disposed on the top of such body for displaying information which has either been manually entered or scanned in or received from a base radio transceiver. A radio frequency transceiver is also disposed in the hand held body for receiving and transmitting information between the hand held body and the base radio transceiver. A scanner is provided for optically reading information and transmitting such information. A modular housing is provided for holding the scanner and a mechanism is provided for selectively attaching or detaching the housing to a bottom portion of the hand held body whereby the external portions of hand held body in the housing when attached together are small enough to be received in a shirt pocket, whereby the user can store the apparatus in such shirt pocket when not in use. A wrist, arm and finger mounted terminal/scanner, as well as wearable belt or vest mounted battery packs and other components are shown.

61 Claims, 17 Drawing Sheets

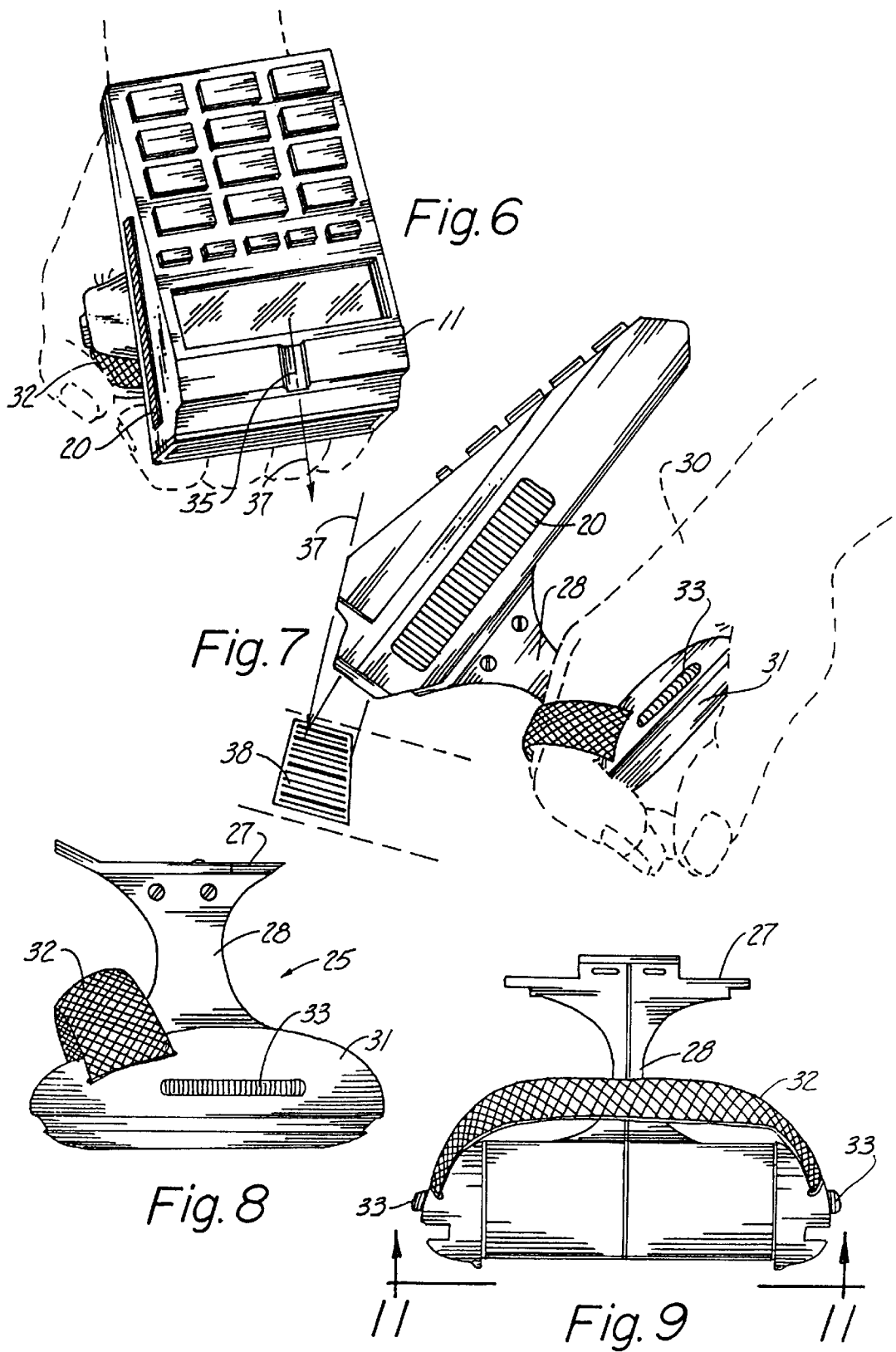

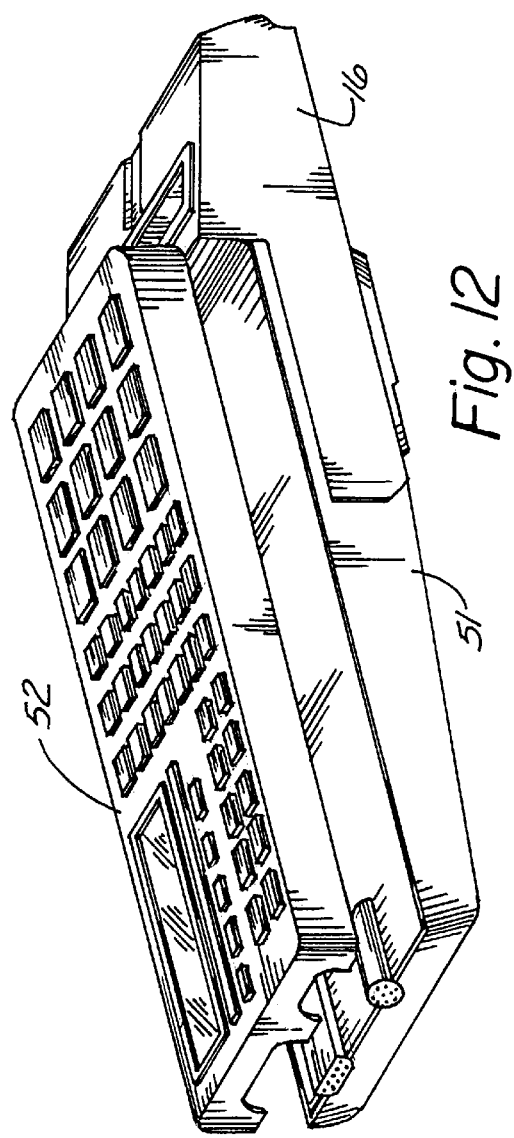
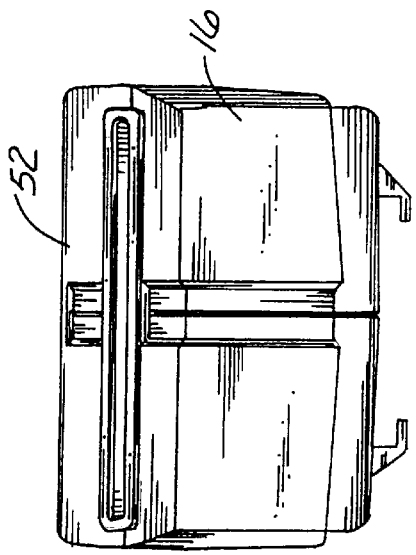
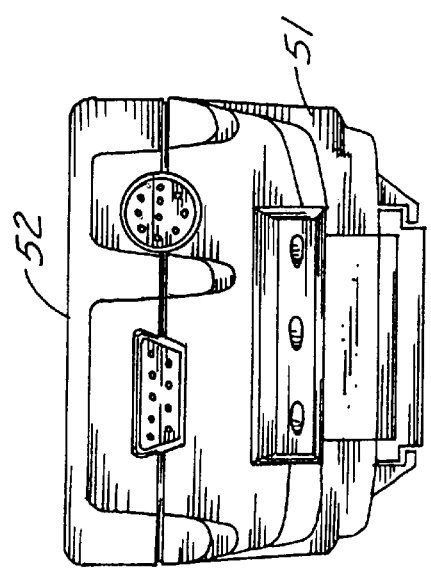

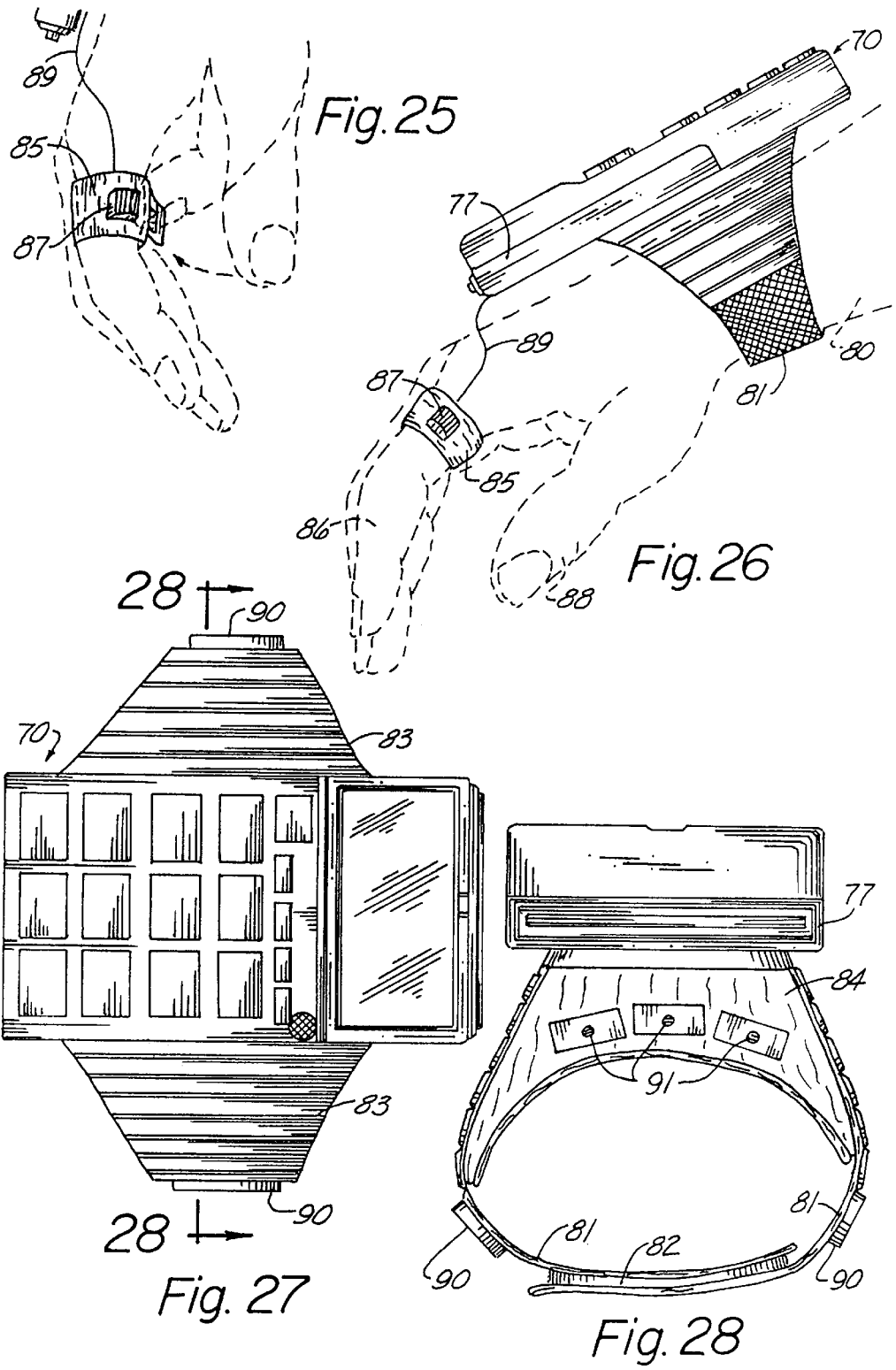

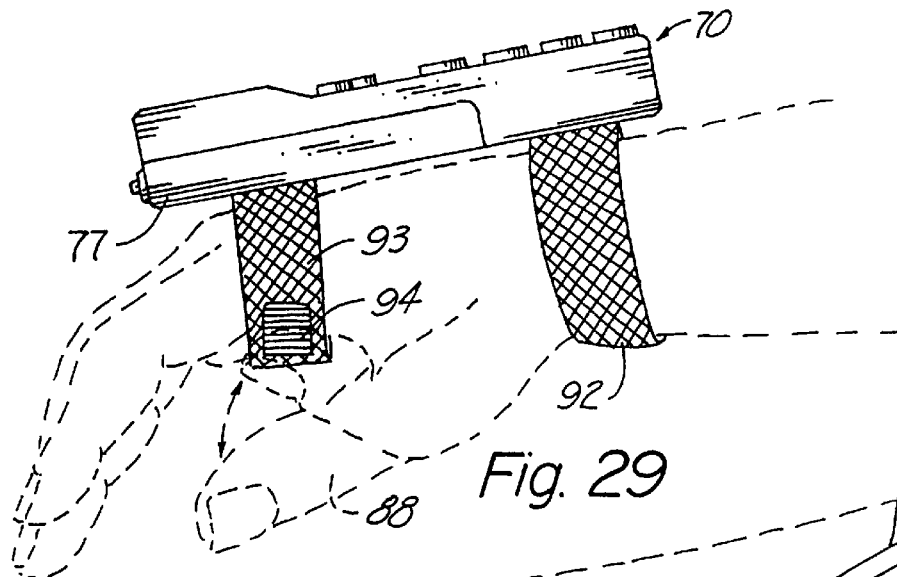
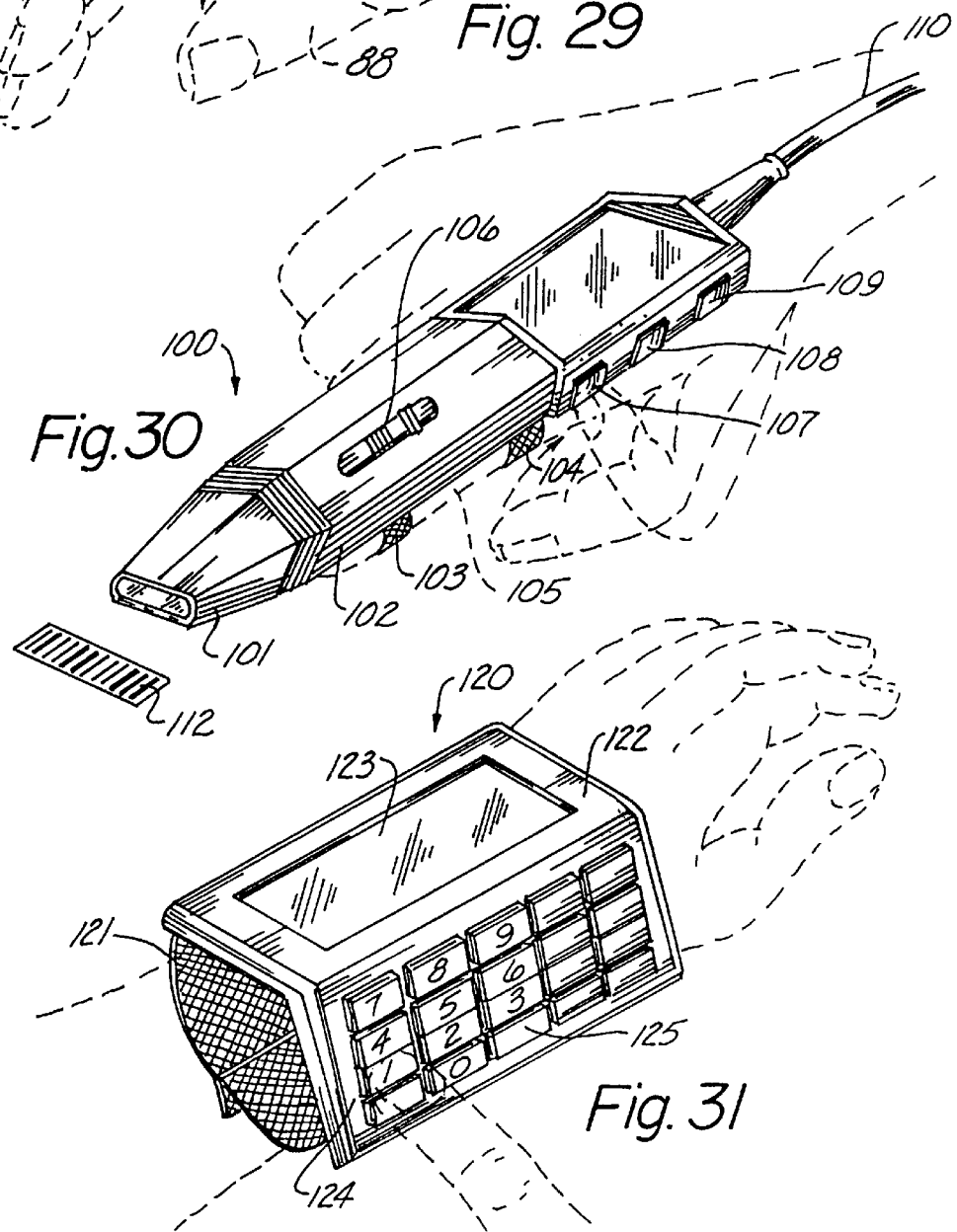
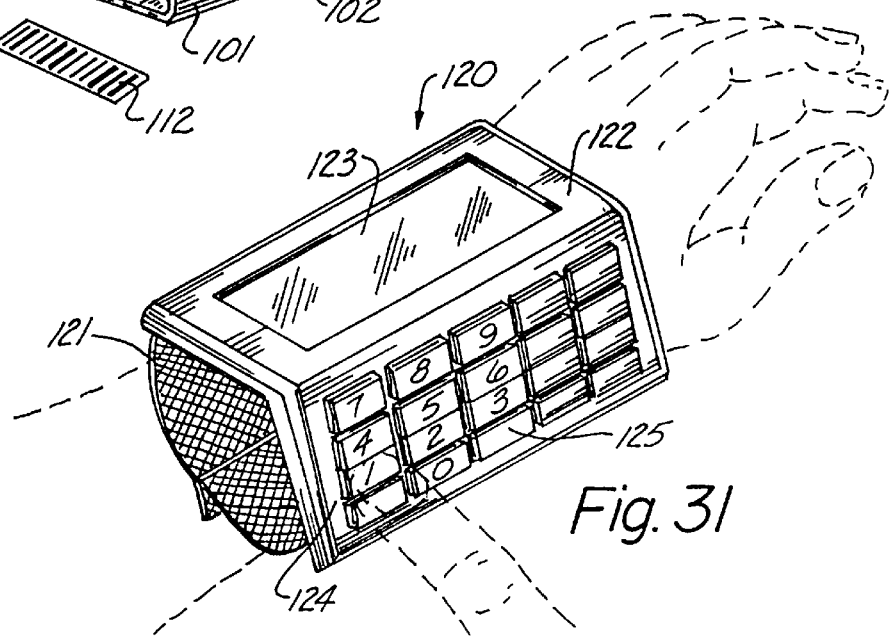

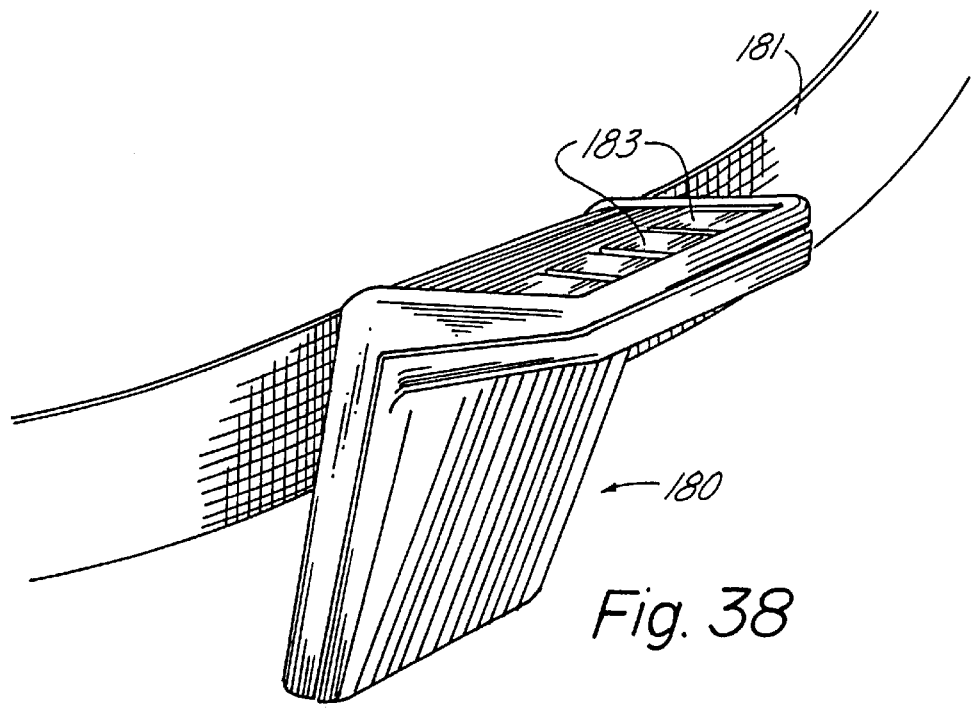
Fig. 38
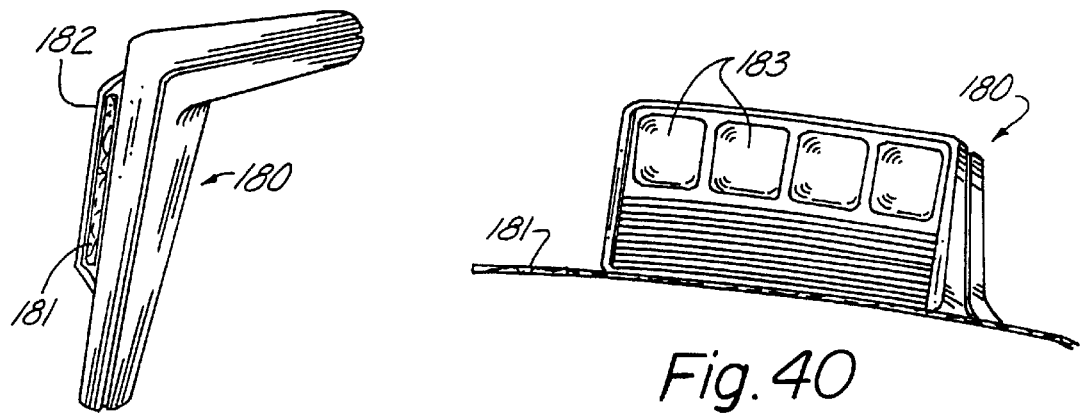
Fig. 39
Fig. 40

MODULAR SCANNER WITH HAND-HELD DATA TERMINAL

This application is a continuation of application Ser. No. 08/772,537, filed Dec. 24, 1996, now abandoned; which is a continuation of application Ser. No. 08/449,630, filed May 24, 1995, now U.S. Pat. No. 5,587,577, issued Dec. 24, 1996; which is continuation of application Ser. No. 08/195,154, filed Feb. 10, 1994, now abandoned; which is a continuation-in-part of application Ser. No. 07/872,717, Apr. 23, 1992, now U.S. Pat. No. 5,305,181, issued Apr. 19, 1994.

INCORPORATION BY REFERENCE

The following is incorporated herein by reference:

The descriptive matter of the above-referred to PCT application PCT/US90/03282, filed Jun. 7, 1990, as published under International Publication No. WO 90/16033 on Dec. 27, 1990; U.S. Ser. No. 07/364,902 filed Jun. 8, 1989; now abandoned U.S. Ser. No. 07/674,756 filed Mar. 25, 1991, now abandoned, in the names of Schultz et al.; U.S. Ser. No. 07/812,767, filed Dec. 23, 1991, now abandoned, entitled "MODULAR SCANNER WITH HAND-HELD DATA TERMINAL" in the name of Darald R. Schultz, U.S. Ser. No. 07/364,594 filed Jun. 7, 1989, now abandoned, and Ser. No. 07/364,902 filed Jun. 8, 1989, both entitled in the names of Darald R. Schultz et al (USA National Phase of PCT/US90/03282), U.S. Ser. No. 07/660,615 filed Feb. 25, 1991, now U.S. Pat. No. 5,218,187 and now naming Darald R. Schultz as one of the joint inventors; and U.S. Ser. No. 07/816,705, filed Jan. 2, 1992, now abandoned, entitled "MODULAR SCANNER WITH HAND-HELD DATA TERMINAL" in the name of Darald R. Schultz et al.

TECHNICAL FIELD

The present invention relates generally to a hand held data terminal which will fit into a shirt pocket and which has a modular scanner attached thereto. The present invention also relates to a hand held data terminal which has a flexible housing which can be attached to a user's arm or wrist. It can also be attached to larger hand held data terminals or to a tethered terminal device. The invention also relates to a pedestal grip and docking apparatus associated therewith and to a wrist mounted and a back-of-the-hand mounted terminal and scanner.

BACKGROUND ART

In the past, hand held data terminals have been available with scanners tethered thereto. These structures typically needed to be held in two hands, with one hand holding the terminal and the other hand holding the scanner. This becomes a problem, especially when it is desired to manually enter information into the terminal. This is because one hand is typically used to hold the terminal and the other hand used to enter information through a keyboard or the like, which would leave the scanner dangling by its tethered cord.

Attempts to combine a scanner into a hand held unit without the tethered attachment have resulted in hand held units which are too large to be held in a shirt pocket or the like. Consequently, there is a need for a terminal having a scanner integrated therein which is small enough to fit into a shirt pocket or the like, or for a terminal and/or scanner which overcomes the aforementioned problems.

DISCLOSURE OF THE INVENTION

The present invention relates generally to a hand held body for receiving, storing and transmitting information having a keyboard in the top thereof for manually entering information therein. A display is disposed on the top of such body for displaying information which has either been manually entered or scanned in or received from a base radio transceiver. A radio frequency transceiver is also disposed in the hand held body for receiving and transmitting information between the hand held body and the base radio transceiver. A scanner is provided for optically reading information and transmitting such information to the hand held body. A housing is provided for holding the scanner and a mechanism is provided for selectively attaching or detaching the housing to a bottom portion of the hand held body whereby the external portions of hand held body in the housing, when attached together, are small enough to be received in a shirt pocket, whereby the user can store the apparatus in such shirt pocket when not in use.

An aiming structure is provided on the body hand or housing for permitting the user to aim the scanner at a bar code or the like.

Because of the small size of the combined body and housing, a grip structure is provided for facilitating easy maneuverability of the combined body and housing for scanning purposes and for docking purposes. A wrist mounted or back-of-the-hand mounted device is also provided for further facilitating the use of such combined body and scanner, including a trigger mechanism which can be operated by the same hand that has the combined body and housing attached thereto. Belt or vest wearable components are also disclosed.

An object of the present invention is to provide an improved hand held data terminal and modular scanner.

Another object of the present invention is to provide a hand held data terminal with a modular scanner which can be stored in a shirt pocket when not in use.

Another object of the present invention is to provide a modular scanner which can be used on a smaller shirt pocket type hand held data terminal or on a larger hand held data terminal.

A still further object of the present invention is to provide a hand gripping apparatus for use in association with a shirt pocket hand held data terminal with modular scanner.

A still further object of the present invention is to provide a docking system for use with a hand held data terminal and scanner in conjunction with a gripping mechanism.

A still further object of the present invention is to provide a hand held data terminal with modular scanner which can be attached to the wrist or the back of a hand and having a trigger for operating the scanner with the same hand on which it is mounted.

Another object is to provide a wrist mounted terminal with the keyboard and/or keys disposed in two separate planes;

A still further object is to provide a terminal mounted on a flexible frame whereby the keys and/or display can flex with regard to each other for the comfort of the user.

A still further object is to put the heaviest part of this computer equipment, such as a battery pack on a belt, vest or the like to produce closer to a hands free or fatigue free operation.

Other objects, advantages, and novel features of the present invention will become apparent from the following detailed description of the invention when considered in conjunction with the accompanying drawings.

BRIEF DESCRIPTION OF THE DRAWINGS

FIG. 6 is a perspective view of the apparatus generally shown in FIG. 1, shown in the process of scanning a bar code;

FIG. 7 is a side elevational view of the apparatus as used in FIG. 6 but showing the process of aiming the device toward a bar code with the gripping device attached thereto;

FIG. 8 is a side elevational view of the gripping device shown in FIG. 7;

FIG. 9 is a front view of the gripping device shown in FIGS. 7 and 8;

FIG. 12 is a perspective view of the modular scanning device shown attached to a larger hand held data terminal having an interchangeable and display apparatus associated therewith;

FIG. 13 is a view of one end of the apparatus in FIG. 12;

FIG. 14 is a view of the other end of such apparatus of FIG. 11;

FIG. 25 is a view of a trigger for activating a scanner or the like shown on a hand in dashed lines and which is connected by a wire to the hand held data terminal;

FIG. 26 is a side elevational view of the hand held data terminal of FIG. 18 shown attached to the wrist of a hand and arm with a trigger mechanism attached to one finger of such hand;

FIG. 27 is a top plan view of the apparatus shown in FIG. 25;

FIG. 28 is a cross sectional view taken along line 27—27 showing how batteries are stored in the structure which attaches the hand held data terminal to the wrist;

FIG. 29 shows a cloth strap/Velcro attaching mechanism for attaching a hand held data terminal of FIG. 19 to the back of the user's hand and having a trigger mechanism provided within easy access of the thumb of the same hand onto which the hand held data terminal is attached;

FIG. 30 is a perspective view of a finger mounted scanner and terminal with display and control buttons;

FIG. 31 is a perspective view of a wrist or arm mounted terminal having the display disposed in a different plane than the keyboard;

FIG. 38 is a perspective view of a combined battery pack, computer and radio frequency link device;

FIG. 39 is aside view of the FIG. 38 device;

FIG. 40 is a top view of the FIG. 38 device;

BEST MODES FOR CARRYING OUT THE INVENTION

Figure 1:
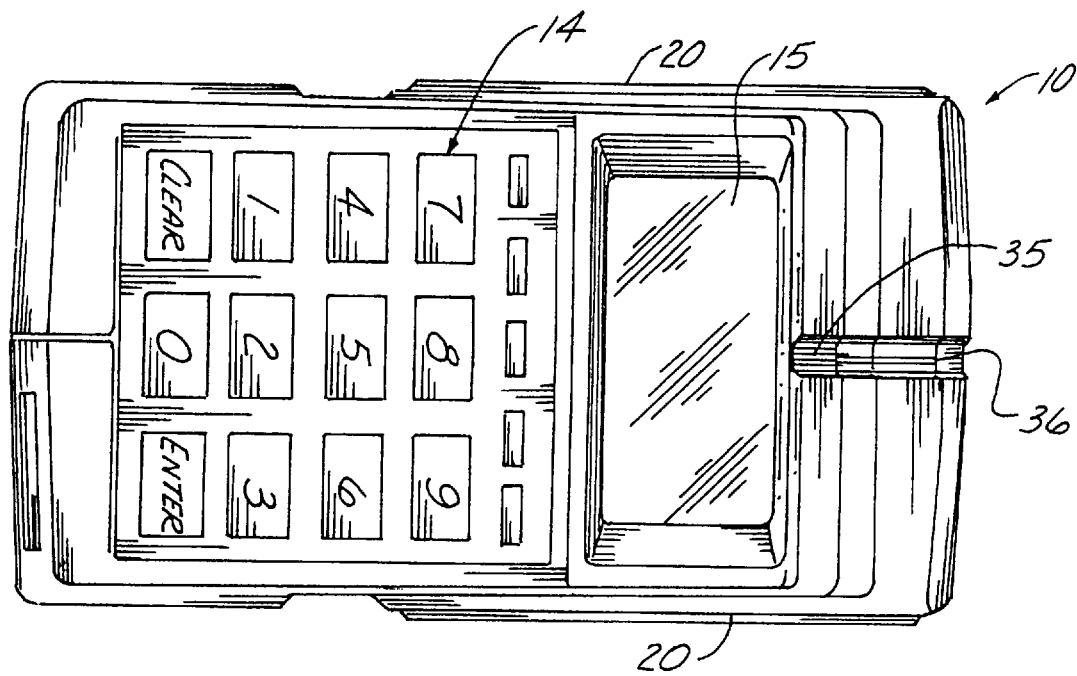
FIG. 1 is a top plan view of a preferred embodiment of the present invention showing a hand held data terminal having a modular scanner attached thereto.
Figure 2:
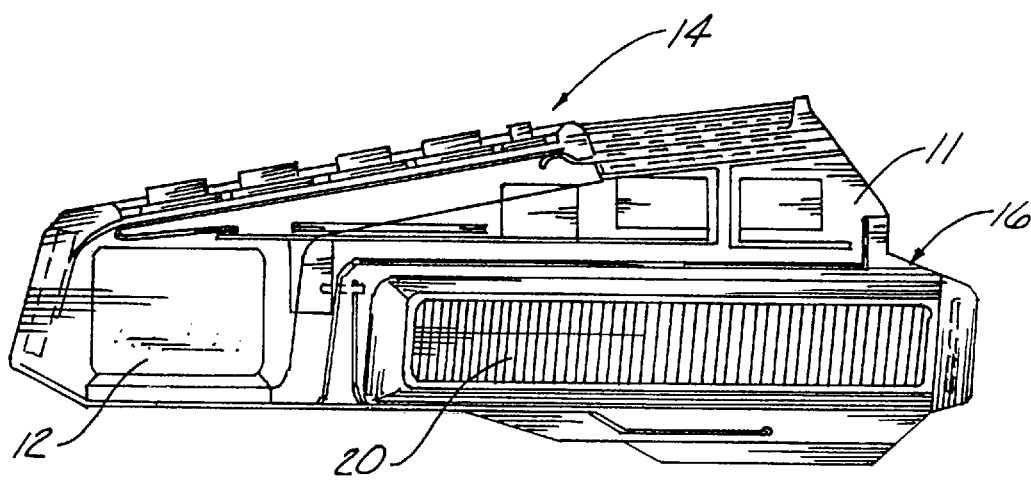
FIG. 2 is a side elevational view of the apparatus of FIG. 1.
Figure 3:
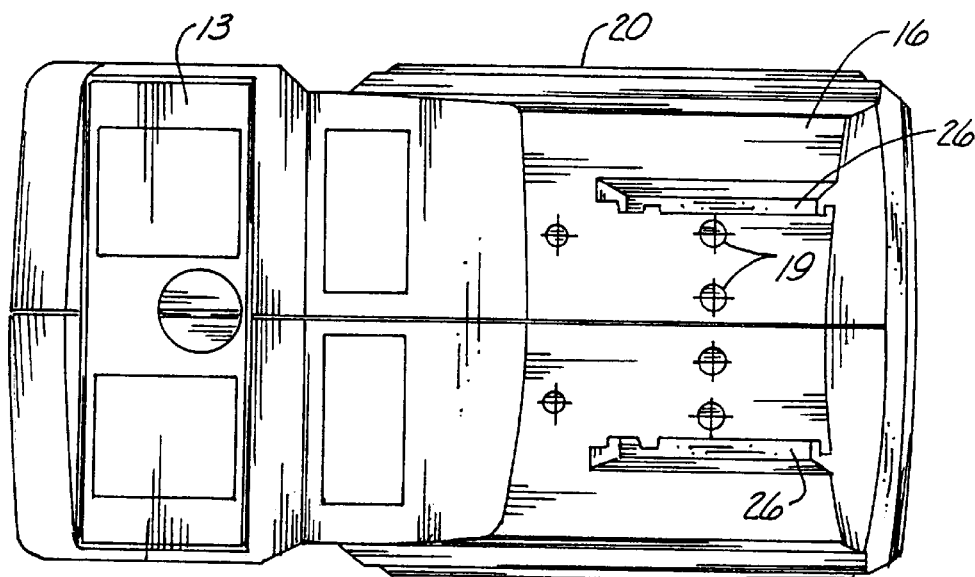
FIG. 3 is a bottom view of the embodiment of FIG. 1.
Figure 4:
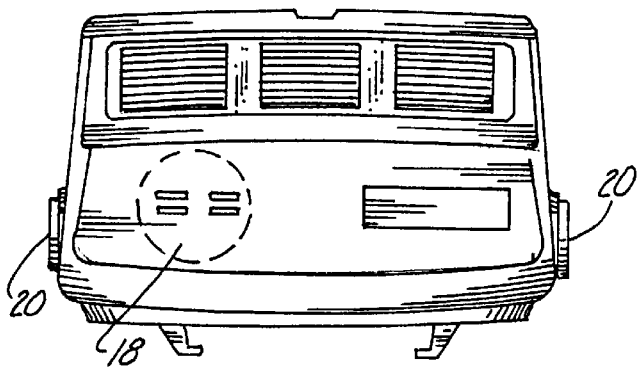
FIG. 4 is a view from one end of the apparatus of FIG. 1.

Referring now to the drawings wherein like reference numerals designate identical or corresponding parts throughout the several views, FIGS. 1–5 show a hand held data terminal (10) constructed in accordance with the present invention and having a body (11). The body (11) has a battery compartment (12) with a removable battery compartment door (13) as shown in FIG. 3. A keyboard (14) and a display (15) are attached to the body (11) as shown in FIGS. 1 and 2.

Figure 5:
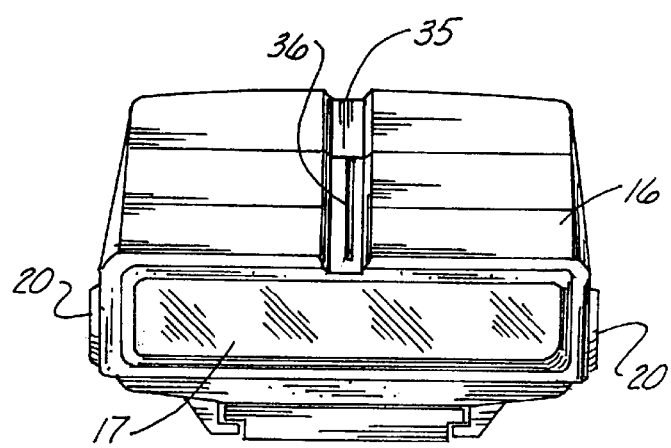
FIG. 5 is a view of the front end of the apparatus of FIG. 1 showing the scanner and aiming device associated therewith.

A modular scanner (16) is provided, which can be of a laser or CCD type. A front laser window (17) is shown in FIG. 5. The housing (11) has a speaker (18), shown in FIG. 4 which can provide an audio signal for various occurrences which can be programmed into the hand held data terminal (10).

Elements (19) on the bottom of the housing (16) of the modular scanner can be either metal contacts for providing electrical contact to recharge the batteries within the battery compartment (12) and/or to communicate information, or they can be optical interfaces for communicating information through optical lines or they can be a combination of metal electrical contacts and optical interfaces.

Triggers (20) on each side of the housing (16) can be utilized to actuate the scanner within housing (16). These triggers (20) are disposed on each side of the housing (16) so that they can be actuated with the thumb of either a right hand user or a left hand user and furthermore, they extend almost the entire length of the housing (16) so that regardless of where the housing (16) is grasped, the thumb of the hand grasping the housing can easily access a trigger (20).

An important novel feature of this embodiment of the present invention is the relatively small size of the body of the hand held terminal (11). The size aspect of this embodiment are discussed in more detail below. Specifically, reference should be made to the discussion of FIGS. 19 and 20.

Referring to FIGS. 6—10, it is noted that a gripping device (25) is shown for attachment to the bottom of housing (16) by flanges (26) integrally attached thereto. Portion (27) on pedestal (28) slides in and under the flanges (26) on housing (16) so that contacts or optical interfaces (29) on member (27) will operably connected with contacts or optical interfaces (19) on the bottom of housing (16). Once the housing (16) and the grip (25) are connected together as is shown in FIG. 7, a hand (30) as shown in FIG. 7 in dashed lines can grasp the base (31) and have the pedestal (28) between the fingers of the hand (30) such that an elastic member (32) will bias the fingers of the hand (30) towards the enlarged portion (31) of the gripping device (25). A secondary trigger (33) is disposed on each side of the enlarged portion (31) of the gripping device (25) and this can also be used to actuate the scanner within the housing (16) instead of actuating the scanner with triggers (20), or, alternatively, the triggers (33) can be used as function buttons to be programmed by the user.

Figure 11:
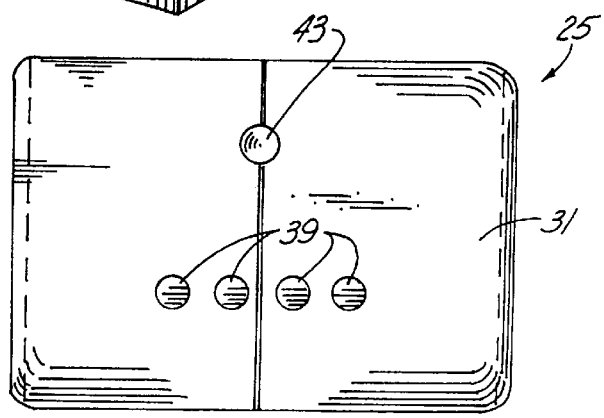
FIG. 11 is a bottom view of the gripping device taken along line 11—11 of FIG. 9.
Figure 15:
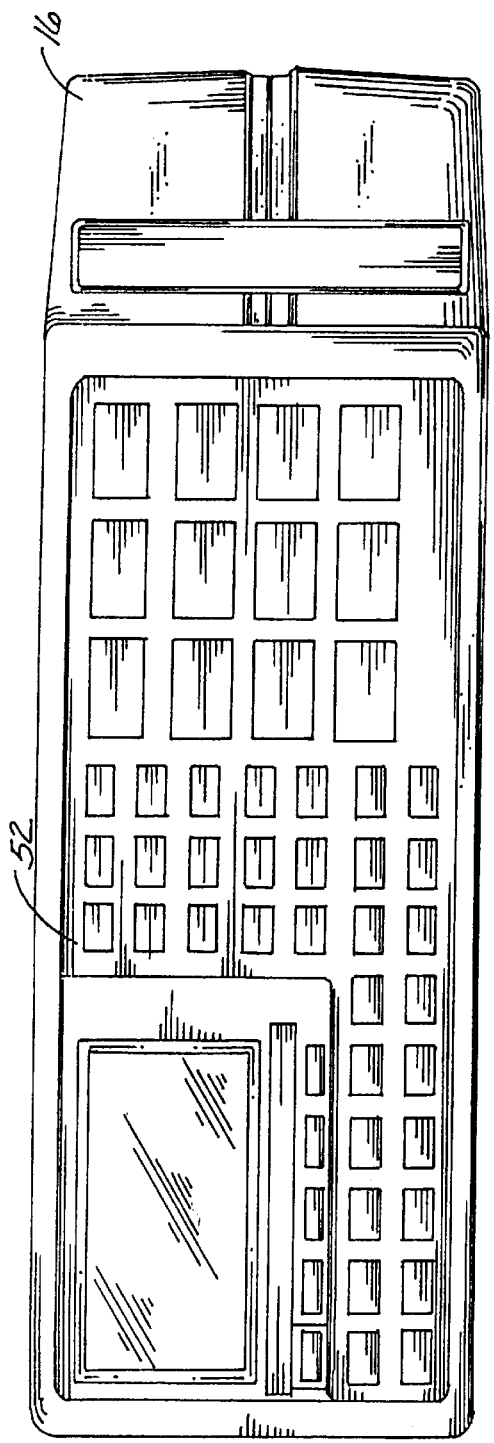
FIG. 15 is a top plan view of the hand held data terminal of FIG. 12, having the modular scanner of the present invention attached thereto.
Figure 16:
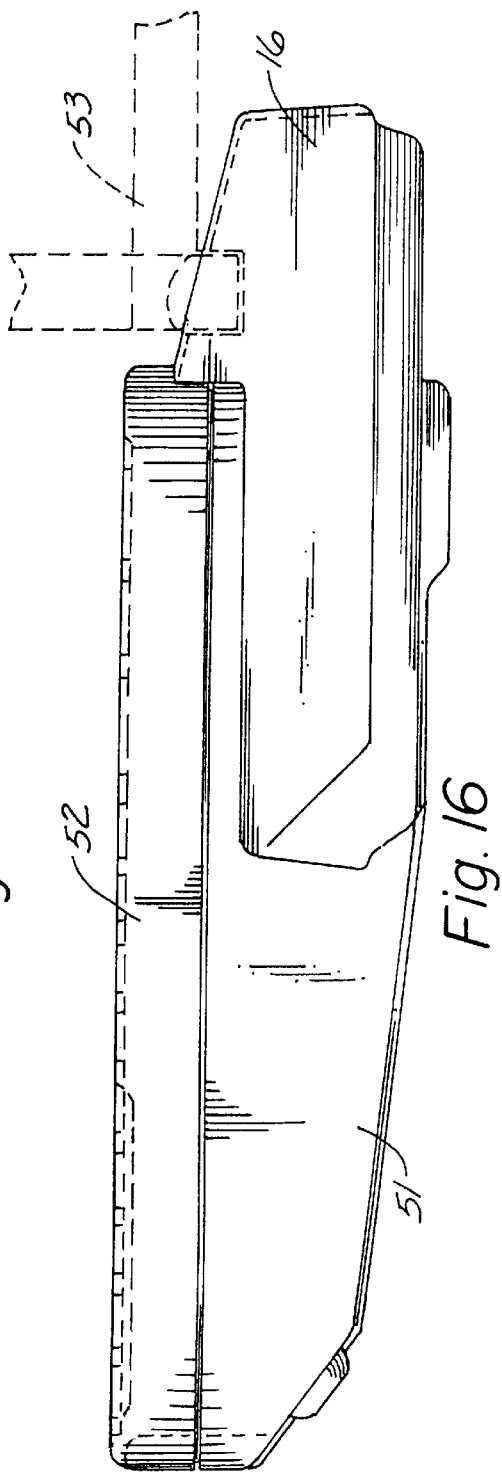
FIG. 16 is a side elevational view of FIG. 14, showing an optional antenna in dashed lines.

FIG. 11 shows the bottom of the gripping device (25) and shows electrical contacts or optical interfaces (39) which are connected directly to respective contacts or optical interfaces (29).

A docking device (40) has contacts for optical interfaces (49) thereon for contacting or interfacing with contacts or interfaces (39) in the bottom of the gripping device (25). Projections (41) on the top of the docking device (40) extend into grooves (42) in the lower portion (31) of gripping device (25) so that the gripping device (25) can be slid into the docking device (40) from either side thereof until the upwardly biased ball bearing (48) extends into the depression (43) in the bottom of the enlarged portion (31) of the gripping member (25). When the gripping device (25) is in such a position, the docking device is capable of charging the battery within the battery compartment (12) and/or transferring information to and from the hand held data terminal (10) and a base computer or the like. Stops (not shown) can also be provided on docking device (40) to permit the gripping device (25) to be attached thereto from only one side, for example, and for it to automatically stop so that the contacts or optical interfaces (39) and (49) are in alignment when the stops are contacted.

Referring to FIGS. 6 and 7, it is noted that a groove (35) is disposed in the top of the body (11), and referring to FIGS. 1 and 5, it is noted that a continuation of the groove (36) is disposed in the housing (16) of the scanning module so that the user can sight down the arrow (37) shown in FIGS. 6 and 7 toward a bar code (38).

Figure 10:
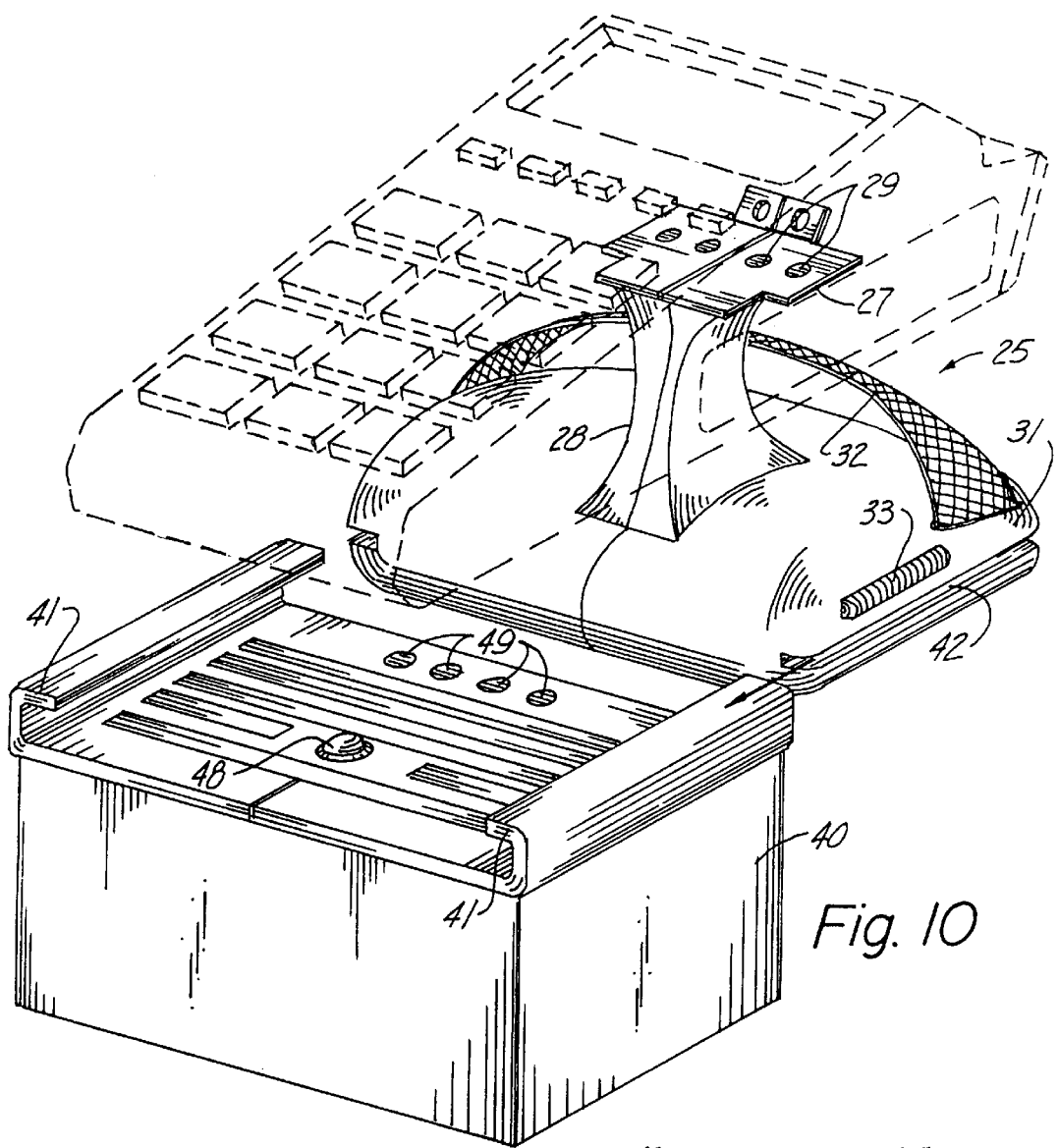
FIG. 10 is a perspective view of the gripping device shown in association with a docking device and also showing the hand held data terminal with a modular scanner shown in dashed lines.

Referring to FIGS. 8, 9 and 10, it is noted that the enlarged portion (31) also can contain a battery pack (not shown) or the like for supplying auxiliary power to the hand held terminal (10). This battery pack is also rechargeable.

Referring now to FIGS. 12, 13, 14, 15 and 16, it is noted that the scanner including housing (16) has been removed from the body (11) and has been reattached to a different body member (51) having a keyboard and display device (52) attached thereto. The scanning module (16) shown in FIG. 16 alternatively has a radio frequency antenna (53) attached thereto which is shown in dashed lines in two of the possible positions thereof.

Figure 17:
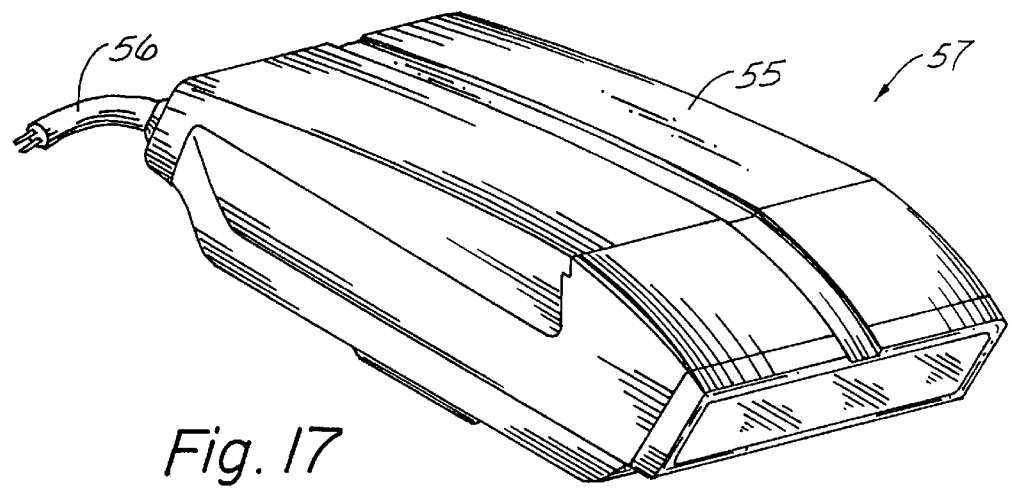
FIG. 17 is a perspective view of a tethered scanner utilizing the modular scanning unit which is also used in the FIG. 1, FIG. 12 embodiments shown herein.
Figure 18:
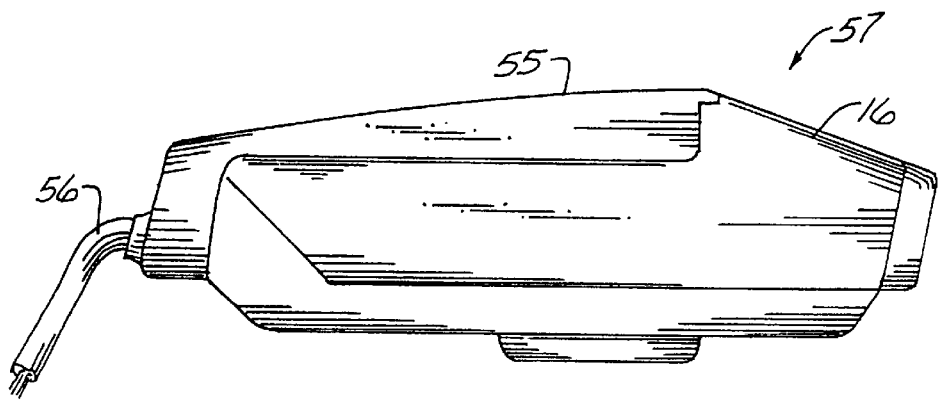
FIG. 18 is a side elevational view of the tethered scanning unit shown in FIG. 16.

Referring now to FIGS. 17 and 18, it is noted that the housing (16) which constitutes the scanning module has been removed from the hand held terminal of either FIG. 1 or FIG. 12 and has been reattached to a body member (55) tethered by a cord (56) to a terminal whereby the scanner (57) formed by these members can be used simply as a scanner and not be used necessarily with an integral hand held data terminal.

Figure 19:
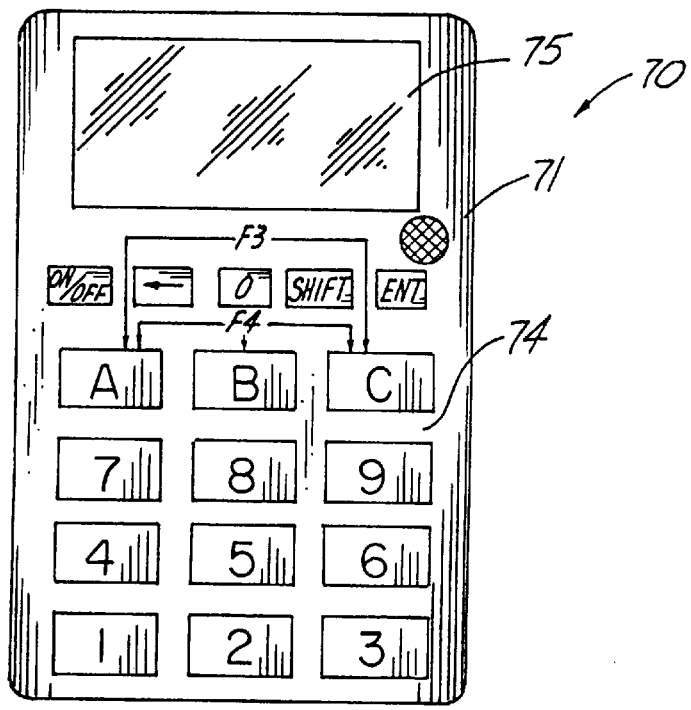
FIG. 19 shows a top plan view of still another hand held data terminal.
Figure 20:
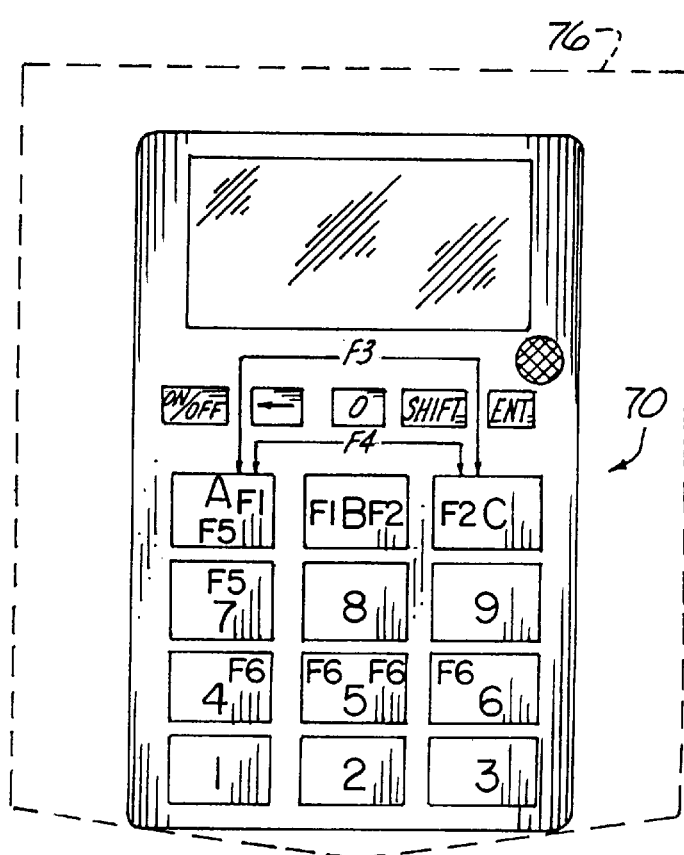
FIG. 20 shows another view of the hand held data terminal and shows how it would fit into a shirt pocket with the shirt pocket being shown in dashed lines of FIG. 20.

FIG. 19 shows another alternative, similar to that shown in the previously filed U.S. patent application Ser. No. 07/782,931 filed Oct. 25, 1991, now abandoned, in the name of Cargin, which is incorporated herein by reference. A hand held data terminal (70) including, but not limited to, a housing (71), keyboard (74) and display (75) is more rectangular in shape than the hand held terminal of the FIG. 1 embodiment. Additionally, the data terminal (70) could include an integrated or modular scanner, an internal low powered radio transceiver and battery power supply. The hand held data terminal (70) is shown in FIG. 20 in combination with a pocket (76) shown in dashed lines in FIG. 20 of a shirt. The hand held data terminal (70) is shown and constructed to be small enough to fit into such pocket (76) of an average size men's dress shirt, the pocket being of a size in the range of 3.5 to 5.5 inches deep and 4 to 5 inches wide.

Figure 21:
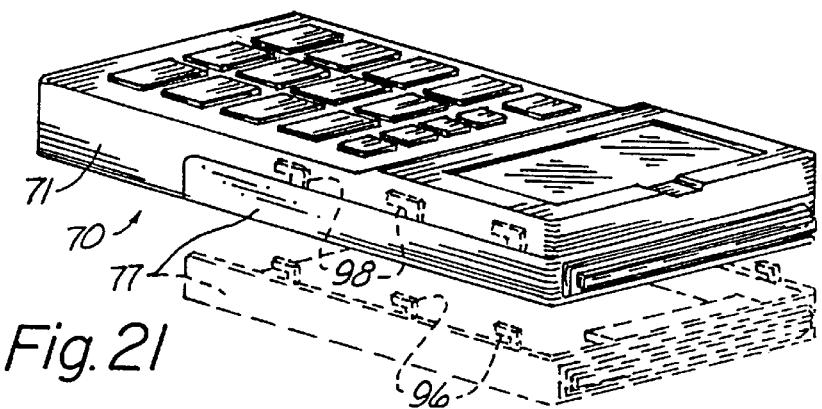
FIG. 21 is a perspective view of the apparatus of FIGS. 19 and 20 showing in dashed lines how the modular scanning unit can be removed therefrom.
Figure 22:
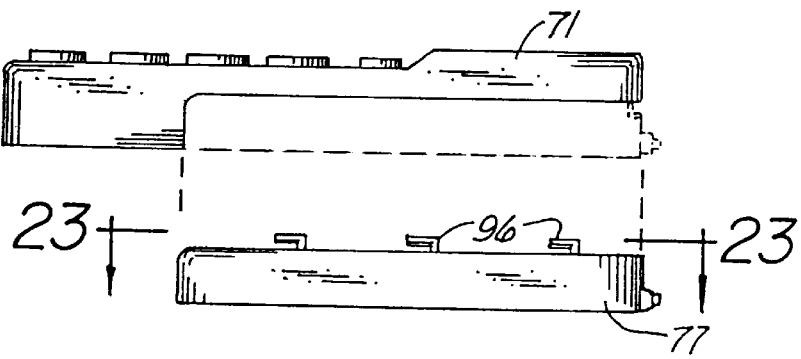
FIG. 22 is a side elevational view of the apparatus of FIG. 19 showing the modular scanning unit removed.

FIG. 21 shows the hand held data terminal (70) with a different modular scanner (77) attached thereto, FIG. 21 showing in dashed lines the scanner before it is attached to the body member (71). Attachment mechanism (96) can be the same as attachment mechanism (56) shown in U.S. patent application Ser. No. 674,756 filed Mar. 25, 1991, abandoned, a continuation of which issued on May 17, 1994, as U.S. Pat. No. 5,313,053, which is incorporated herein by reference. Complementary openings (98) in body (71) receive and hold mechanism (96).

Figure 23:
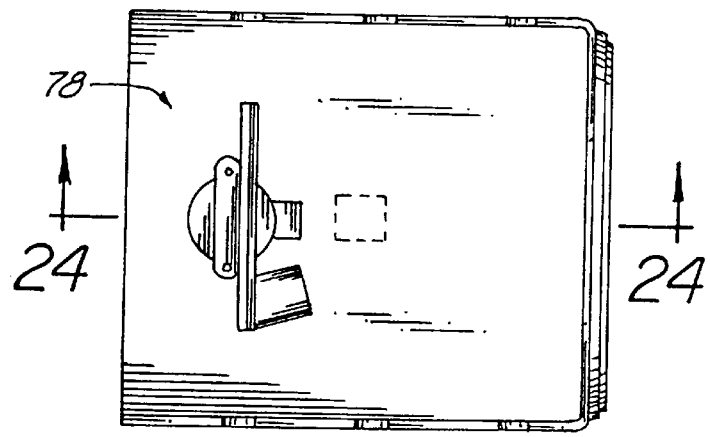
FIG. 23 is a top view of the scanning unit taken along line 22—22 of FIG. 21.
Figure 24:
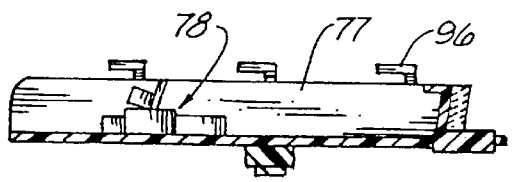
FIG. 24 is a cross sectional view of the scanning unit taken along line 24—24 of FIG. 23.

FIGS. 23 and 24 show a laser scanner (78) which forms the engine for the laser scanner disposed within the housing (77). Of course, it is possible to use a CCD scanner instead of the laser scanner (78) if desired.

Referring now to FIGS. 25–28, it is noted that the hand held data terminal (70) with the laser scanner housing (77) attached thereto is secured to the wrist (80) of the user by a Velcro strap (81) having hook and loop sections (82) disposed thereon as is shown in FIG. 28. The straps (81) are connected to a section (83) having a filler (84), such as foam rubber, for holding rechargeable batteries (91) therein. These rechargeable batteries (91) can either be the primary supply of power for the hand held data terminal (70) or they can provide auxiliary power, either to supplement with or to switch over to in case of power failure within the hand held data terminal (70).

A ring like member (85) is attached to one of the fingers (86) of the hand of the user, although it is to be understood that this ring (85) could go around more than one finger if desired. A trigger (87) on the ring (85) when pushed by the thumb (88), will actuate the scanner within the housing (77). The triggers (90) are wired in parallel with trigger (87). This trigger (87) is connected to the scanner (77) by a cord (89) which leads from the trigger (87) to the scanner (77). Alternatively, triggers (90) on straps (81) as shown in FIG. 28 can be utilized to actuate the scanner within the housing (77).

Referring now to FIG. 29, it is noted that the hand held data terminal (70) with scanner housing (77) attached thereto is attached to the wrist of a user by cloth or elastic straps (92). If these straps are non-elastic, then they will also have Velcro, hook and loop fasteners, similar to the Velcro (82) shown in FIG. 28. Similarly, cloth or elastic straps (93) extend over the palm of the hand shown in dashed lines in FIG. 29 and this connection can also be made by using Velcro if desired. A trigger (94) attached to the strap (93) is wired through a wire in strap (93) (but not shown in FIG. 29) and leads to the scanner within housing (77) such that the thumb (88) of the user can actuate the scanner within housing (77) by pushing on the trigger (94).

Referring to FIG. 30, scanner (100) is a finger mounted device including scanner section (101) which is either a laser scanner or a CCD type scanner for reading a bar code (112) or the like. Housing portion (102) has elastic or Velcro straps (103) and (104) for attaching to a person's finger (105). An on/off switch (106) is provided on housing (102) and function buttons (107), (108) and (109) are provided for various reasons. Typically, the button (107) is thumb-actuated for initiating the scanning of bar code (112). Also, a duplicate number of buttons (107), (108) and (109) are provided on the opposite side of the housing (102) so that it can be readily used by either the right hand or the left hand. The scanner (100) can be connected by cord (110) to a fuller functioning terminal or it can be in radio frequency contact with either a terminal, a printer or a host computer.

Referring now to FIG. 31, an arm or wrist mounted terminal (120) is operably attached by a pair of flexible straps (121) which can be elastic or can be a pair of straps having mated Velcro on the ends thereof. One top surface (122) of the terminal (120) has a display (123) thereon and another surface (124) of the housing terminal (120) has a plurality of keys (125) thereon. This arrangement of having the display at an angle with respect to the buttons (125) permits the display to be easily readable and yet have the buttons easily accessible without the need to be being a contortionist.

Figure 32:
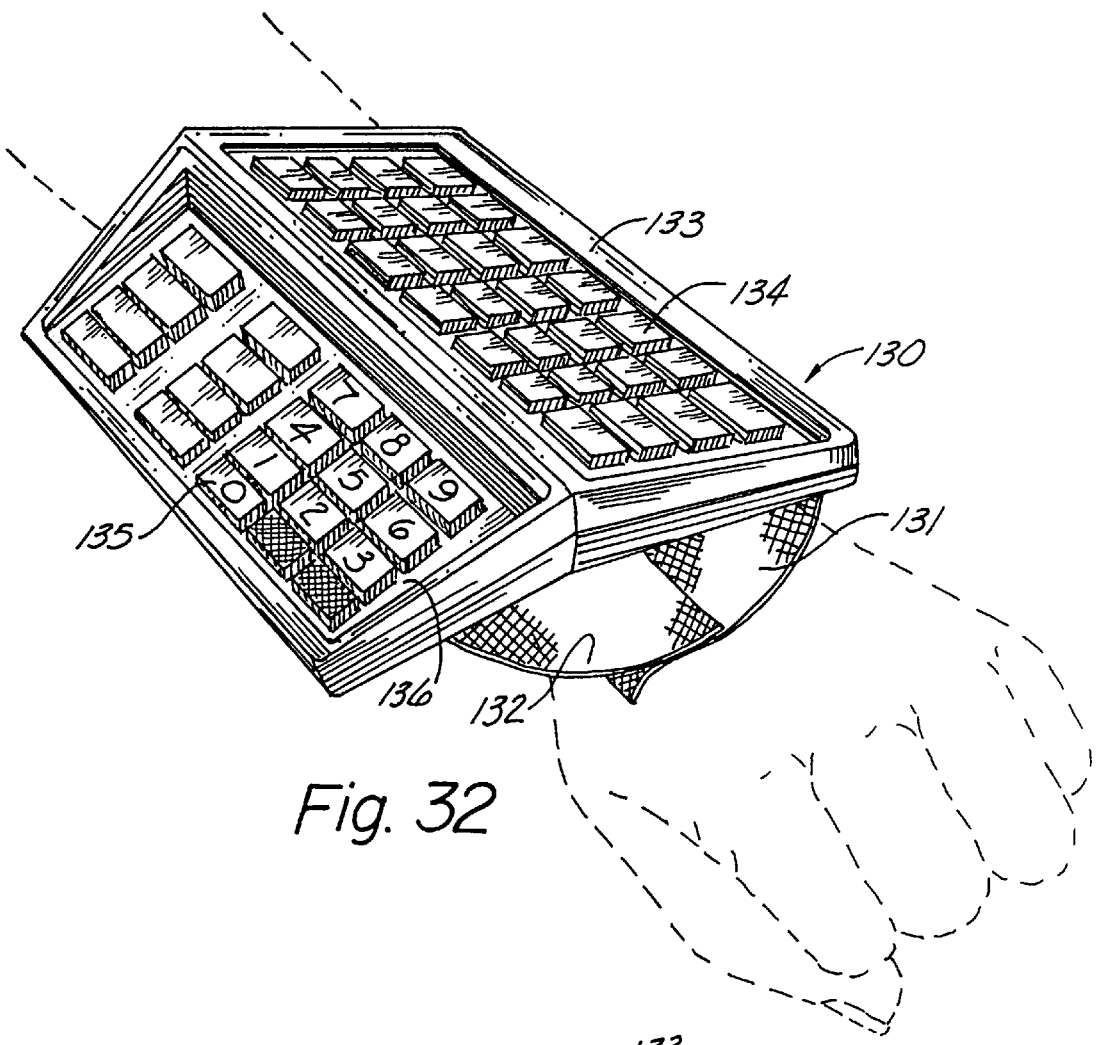
FIG. 32 is a perspective view of another wrist mounted terminal.
Figure 33:
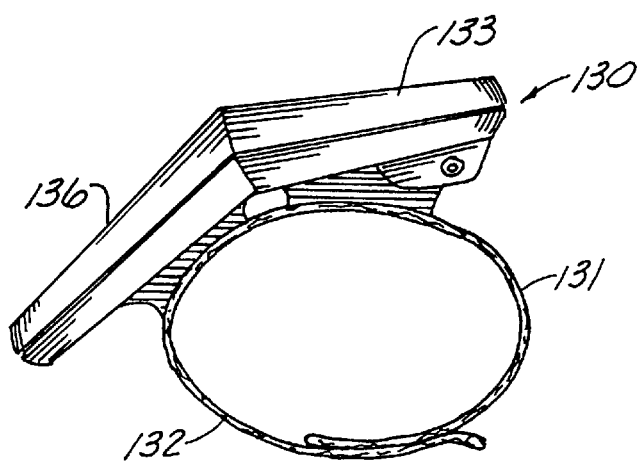
FIG. 33 is a side view of the wrist mounted terminal of FIG. 32.

FIG. 32 shows a wrist or arm mounted terminal (130) having a pair of straps with one side (131) with Velcro on one end and the other mating strap (132) with Velcro thereon so that when they are pressed together in the manner shown in FIG. 33, the device is held onto the wrist, and of course as is well known with Velcro structure, it can easily be released when the terminal (130) is to be removed.

In a fashion similar to the terminal (120), the terminal (130) has a first set of keys (134) mounted on a first surface (133) and a second set of keys (135) mounted on another surface (136) which is disposed at an obtuse angle with respect to the surface (133).

Figure 34:
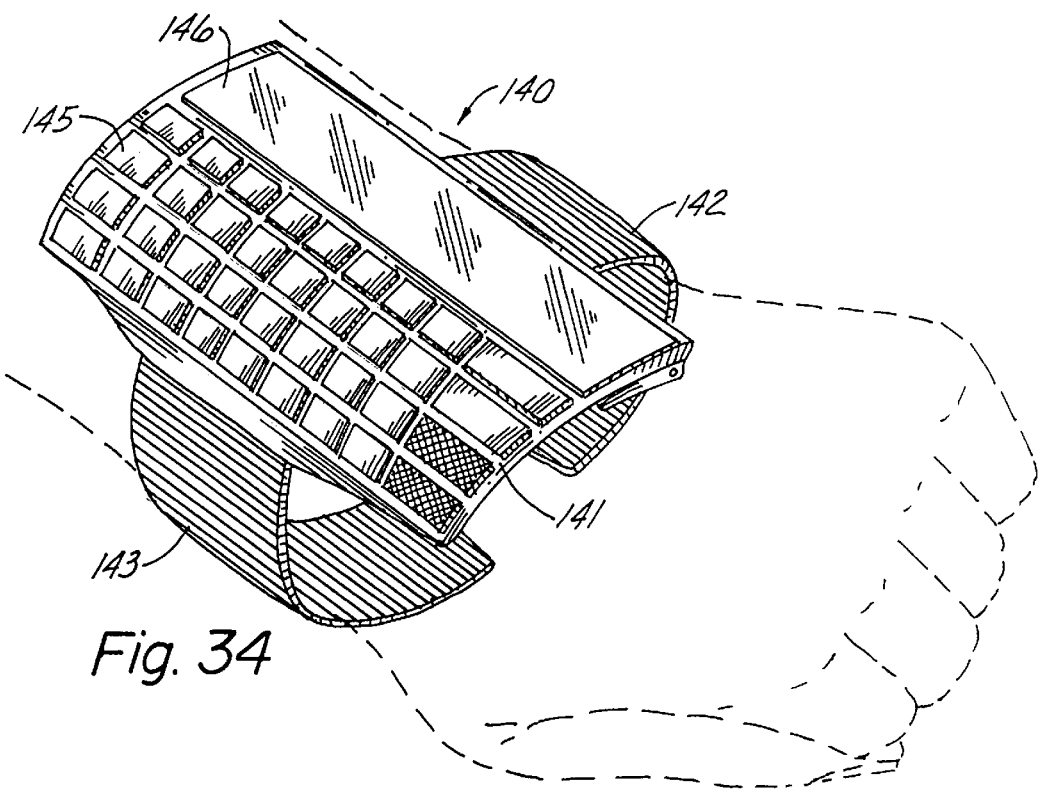
FIG. 34 is a perspective view of a terminal having the keys and display mounted to a flexible frame which will conform to a user's wrist.

Referring now to FIG. 34, a wrist mounted terminal (140) includes a flexible frame (141) which can be of any flexible material but might, for example, be of a flexible polyvinyl chloride with the components of the terminal embedded therein, whereby the terminal body (141) can flex to conform to the shape of the user's wrist or arm when attached by a strap having two flexible portions (142) and (143) affixed to the flexible frame (141). Function buttons (145) can be utilized just like any other terminal having a rigid housing or frame. A display (146) is also mounted to the flexible frame (141).

Figure 35:
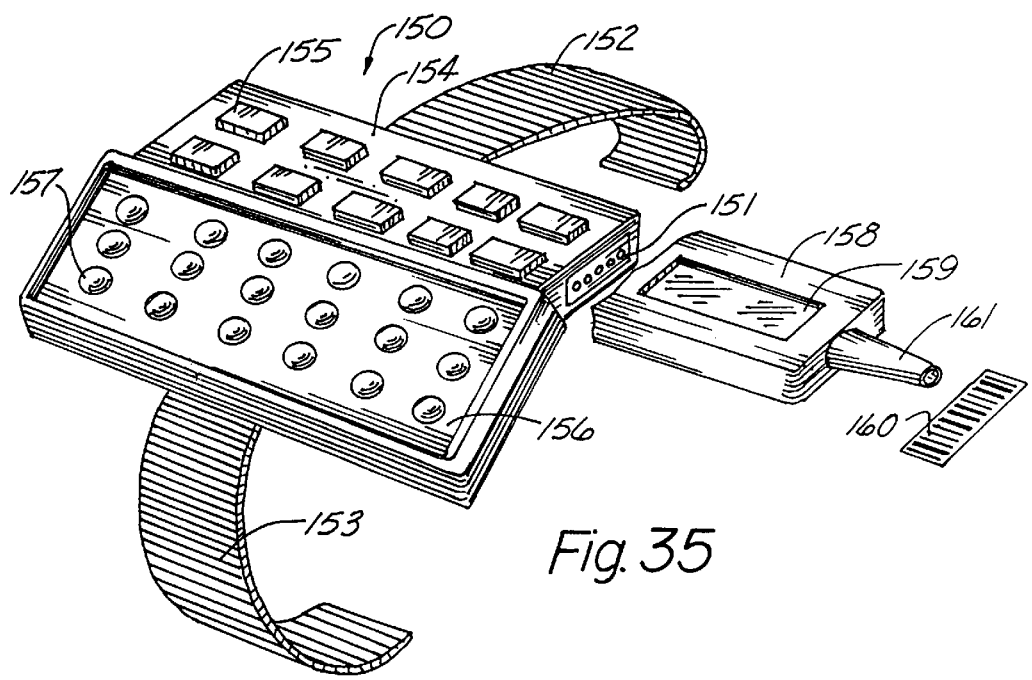
FIG. 35 is a perspective view of a terminal having keys in two planes and a detachable scanner/display all for being worn on the wrist or arm.

Referring now to FIG. 35, terminal (150) is shown having a first strap (152) and a second strap (153) which are interconnectable by Velcro fasteners (not shown). A first housing portion (154) has buttons or keys (155) thereon and a second housing portion (156) has buttons or function keys (157) disposed thereon.

A modular scanner or bar code reader (158) plugs into the portion (154) of terminal (150) and is shown by the plug connector (151). The bar code reader or scanner (158) has a display (159) disposed therein which will read out either what has been scanned or what has been entered by the keys (155) or (157). The bar code (160) can of course be scanned or read using the scanner or reader (158) by moving the arm so that portion (161) of the scanner or reader (158) points toward the bar code (160).

It should be noted that a modular scanner or reader (158) as shown in FIG. 35 could be attached to virtually any of the wrist and hand mounted terminals disclosed in the various embodiments of the present invention. The various terminals accordingly would have the appropriate interface such as the plug connector (151).

Figure 36:
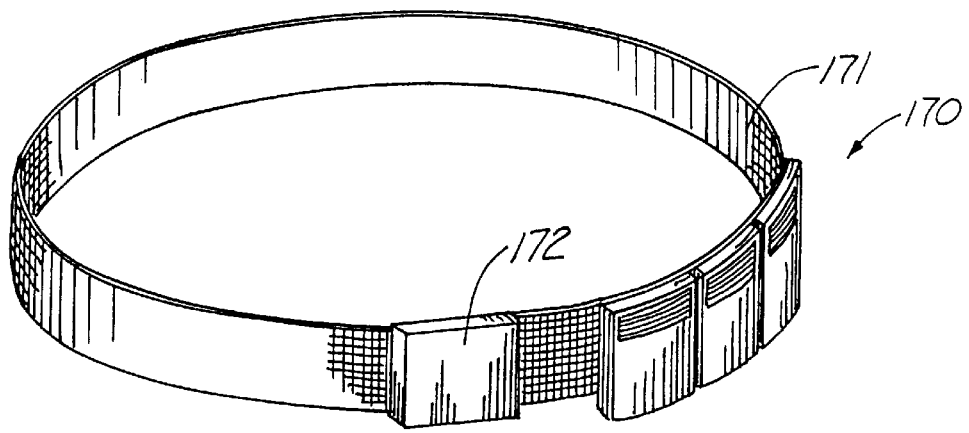
FIG. 36 is a perspective view of a belt mounted modular rechargeable battery pack.
Figure 37:
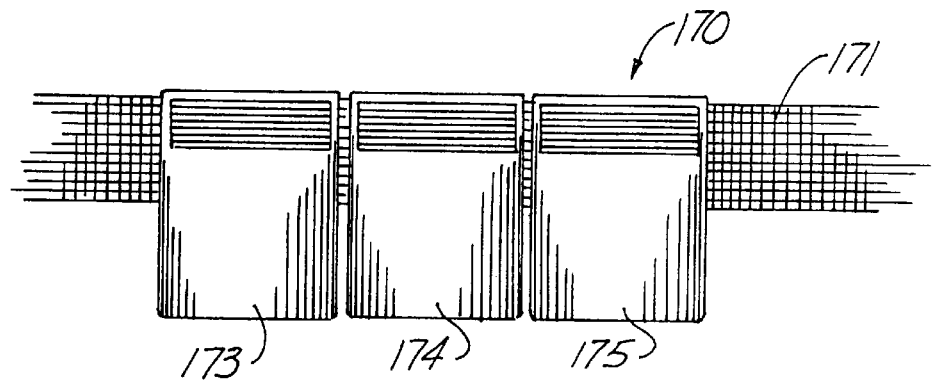
FIG. 37 is a front, enlarged view of the FIG. 36 battery pack.

FIG. 36 shows a plurality of battery packs (170) attached by a belt loop to a belt (171). A conventional belt buckle (172) is also shown. These battery packs (170) are individually referred to as battery packs (173), (174) and (175) and have a flexible interconnect therebetween so that they will conform to the user's belt. A major purpose of the battery pack arrangement (170) is to make the heavier parts of computer terminals, scanners, printers, etc., wearable by the user so that the hand-held terminals, scanners, bar code readers, etc., can be made to be much lighter in weight and therefore, easier to use and producing less fatigue. The flexible battery pack (170) is of course rechargeable and could be mounted on a vest or other wearable apparel.

Referring to FIGS. 38–40, a snap-on battery pack (180) is shown which is also rechargeable and a belt (181) can extend through a loop (182) therein. The device (180) can also include an intelligent computer device and radio frequency communication to a smaller hand-held terminal of lower intelligence (not shown). Function keys (183) are useful for controlling the computer within the modular device (180). This is also for the purpose of putting the heavier weight terminals into a wearable fashion so that the hands of the user are free or only have lighter components, which will prevent fatigue. The devices can be activated by voice or can be a duplex arrangement where the device responds also with a voice message.

Figure 41:
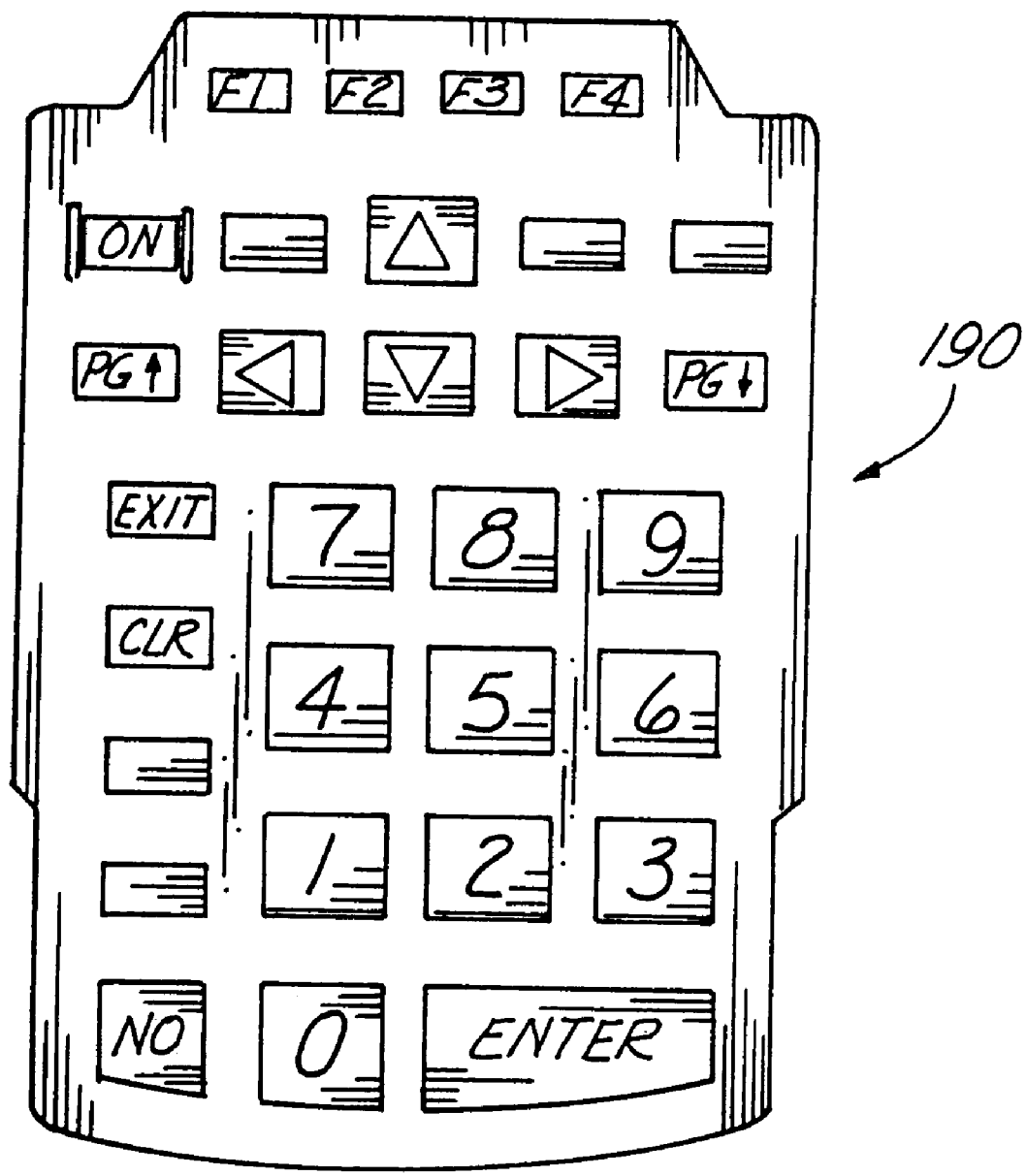
FIG. 41 is a top view of a modular key pad.
Figure 42:
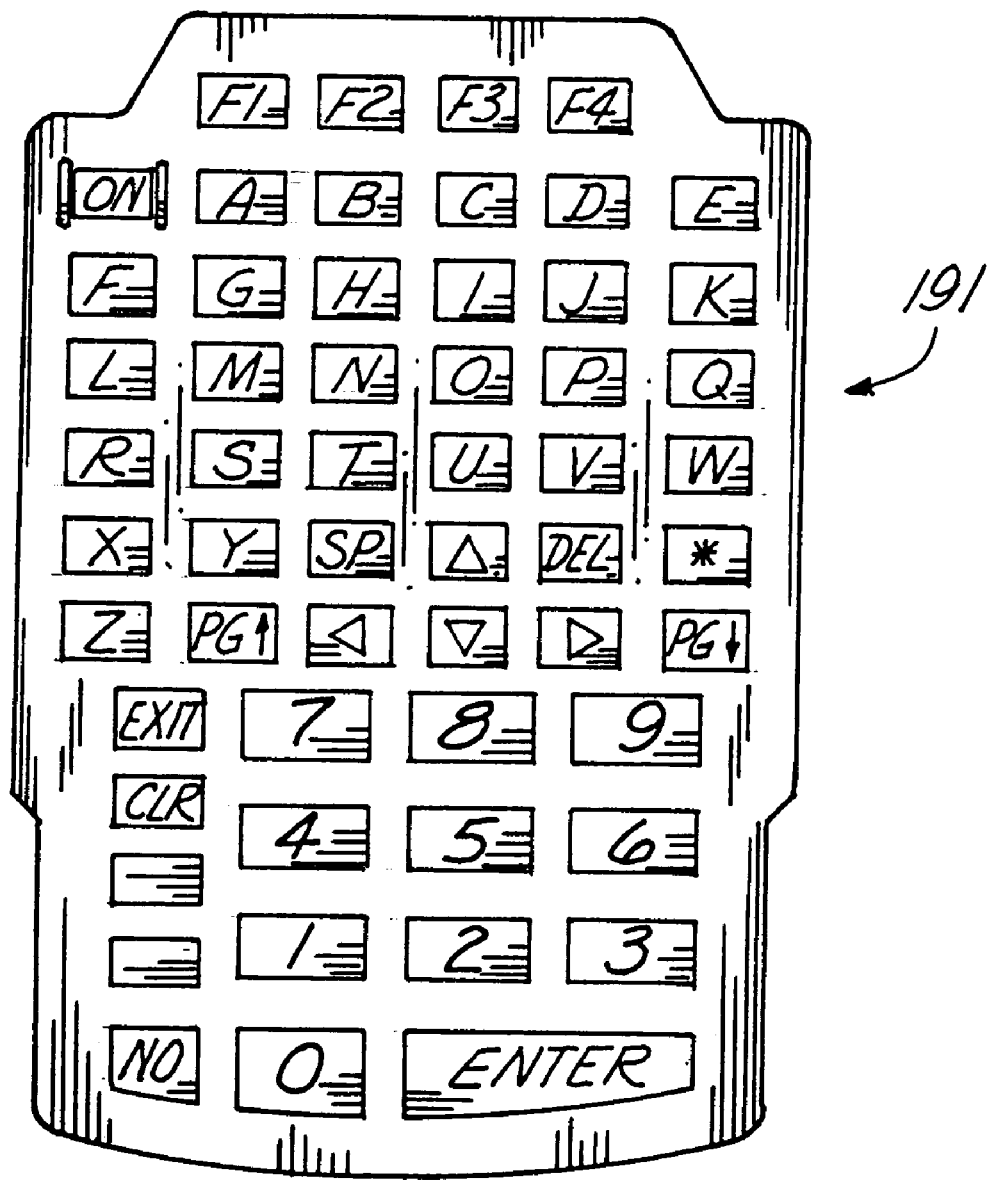
FIG. 42 is a top view of a modular key pad.

Referring now to FIGS. 41 and 42, modular key pads (190 and 191) are shown. In order to increase flexibility of the present invention, the key pad or key board component of the hand held terminal can be made modular such that one key pad can be removed and a different key pad inserted in its place. The modular key pad can be used in conjunction with virtually all of the various disclosed embodiments of the present invention. The hand held terminals would include means for interfacing with the modular key pads as well as means for connecting the modular key pads. The interface could either by electrical, optical or infrared.

Accordingly, it will be appreciated that the objects referred to above are indeed accomplished by use of the embodiments described herein. Obviously, many modifications and variations of the present invention are possible in light of the above teachings. It is therefore to be understood that, within the scope of the appended claims, the invention may be practiced otherwise than as specifically described.

I claim:

1. Apparatus comprising:
    a data receiving unit;
    a housing containing said data receiving unit, said housing including a first portion and a second portion;
    a housing mount apparatus to receive a user's forearm, said housing mount apparatus mounting said first portion of said housing on top of a user's forearm and mounting the second portion of said housing along an inner side of a user's forearm; and an indicia reader connector positioned to connect an indicia reader unit to said data receiving unit over a top side, opposite a palm, of a user's hand.

2. The apparatus of claim 1, further comprising a key section disposed on said housing.

3. The apparatus of claim 2, wherein said key section comprises a modular key pad.

4. The apparatus of claim 2, wherein said key section is located on said second portion.

5. The apparatus of claim 1, further comprising a display disposed on said first portion of said housing.

6. The apparatus of claim 1, further comprising an indicia reader attached to said indicia reader connector.

7. The apparatus of claim 6, wherein said indicia reader is detachable from said housing.

8. The apparatus of claim 6, wherein said indicia reader is an optical indicia reader.

9. The apparatus of claim 6, wherein said indicia reader reads data without coming into physical contact with indicia being read.

10. The apparatus of claim 1, wherein said first portion comprises a first portion undersurface facing a user's forearm when the apparatus is attached to a user and wherein said second portion comprises a second portion undersurface facing a user's forearm when the apparatus is attached to a user, and wherein said first portion undersurface and said second portion undersurface are positioned relative to each other to give said housing a generally v-shaped profile.

11. Apparatus comprising:
an indicia reader;
an interface component receiving information from said indicia reader and communicating information to a user;
a housing supporting said indicia reader and said interface component; and
an attachment component attaching said housing to a user's finger whereby said indicia reader is aimed toward indicia by moving a user's finger relative to its attached hand.

12. The apparatus according to claim 11, wherein said indicia reader comprises an optical indicia reader.

13. The apparatus according to claim 11, wherein said interface component comprises a display.

14. The apparatus according to claim 11, wherein the apparatus extends past the end of a finger to which it is mounted.

15. The apparatus according to claim 11, wherein the apparatus is a stand-alone device that can collect data while mounted to a user's finger even when it is not coupled with any other device.

16. The apparatus according to claim 11, wherein said interface component communicates information in a visual format.

17. The apparatus according to claim 11, wherein said interface component receives pressure sensitive input from a user.

18. The apparatus according to claim 17, wherein said interface component comprises a plurality of pressure sensitive switches.

19. The apparatus according to claim 17, wherein said interface component comprises a trigger activating a reading operation.

20. The apparatus according to claim 17, wherein said interface component is located on two opposite sides of the apparatus.

21. The apparatus according to claim 20, wherein said interface component permits the apparatus to be conveniently used whether mounted to a finger of a right hand or a finger of a left hand.

22. The apparatus according to claim 11, further comprising a communication component.

23. The apparatus according to claim 22, wherein said communication component comprises a conductive link to an externally located device.

24. The apparatus according to claim 23, wherein said conductive link runs along a forearm of a user.

25. The apparatus according to claim 23, wherein said conductive link comprises a cord.

26. The apparatus according to claim 23, wherein said communication component comprises a radiant energy transceiver.

27. The apparatus according to claim 26, wherein said radiant energy transceiver comprises a radio frequency transceiver.

28. The apparatus according to claim 22, wherein said communication component communicates with a remotely located device.

29. The apparatus according to claim 28, wherein said remotely located device comprises an output device.

30. The apparatus according to claim 29, wherein said output device comprises a printer.

31. The apparatus according to claim 28, wherein said remotely located device comprises a computer.

32. The apparatus according to claim 28, wherein said remotely located device comprises a data terminal.

33. The apparatus according to claim 28, wherein said remotely located device comprises an apparatus with more functions, thereby creating a data collection system providing a variety of data handling services.

34. Apparatus comprising:
a data tag reader;
a data receiving component receiving input from a user;
a housing including said data tag reader and said data receiving component; and
an attachment component attaching said housing to a user's finger;
wherein the apparatus is operational in a stand-alone mode, collecting data while mounted to a user's finger and not physically connected with any other device.

35. The apparatus according to claim 34, wherein the apparatus extends past the end of a finger to which it is mounted.

36. The apparatus according to claim 34, wherein said data receiving component comprises a user interface communicating information in a visual format.

37. The apparatus according to claim 34, wherein said data receiving component receives pressure sensitive input from a user.

38. The apparatus according to claim 37, wherein said data receiving component comprises a push button.

39. The apparatus according to claim 37, wherein said data receiving component comprises a plurality of pressure sensitive switches.

40. The apparatus according to claim 34, wherein said data receiving component is located on two opposite sides of the apparatus.

41. The apparatus according to claim 40, wherein said data receiving component permits the apparatus to be conveniently used whether mounted to a finger of a right hand or a finger of a left hand.

42. The apparatus according to claim 34, wherein said data receiving component comprises a trigger activating a reading operation.

43. The apparatus according to claim 34, wherein said data tag reader comprises an optical data reader.

44. The apparatus according to claim 43, wherein said optical data reader comprises a bar code reader.

45. The apparatus according to claim 43, wherein said optical data reader comprises a laser illumination source.

46. The apparatus according to claim 34, wherein said attachment component is a flexible strap.

47. The apparatus according to claim 34, wherein said attachment component comprises a plurality of flexible straps.

48. The apparatus according to claim 34, further comprising an activation switch activating operation of the apparatus.

49. The apparatus according to claim 34, further comprising a communication component.

50. The apparatus according to claim 49, wherein said communication component comprises a conductive link to an externally located device.

51. The apparatus according to claim 50, wherein said conductive link runs along a forearm of a user.

52. The apparatus according to claim 50, wherein said conductive link comprises a cord.

53. The apparatus according to claim 49, wherein said communication component comprises a radiant energy transceiver.

54. The apparatus according to claim 53, wherein said radiant energy transceiver comprises a radio frequency transceiver.

55. The apparatus according to claim 49, wherein said communication component communicates with a remotely located device.

56. The apparatus according to claim 55, wherein said remotely located device comprises an output device.

57. The apparatus according to claim 56, wherein said output device comprises a printer.

58. The apparatus according to claim 55, wherein said remotely located device comprises a computer.

59. The apparatus according to claim 55, wherein said remotely located device comprises a host computer.

60. The apparatus according to claim 55, wherein said remotely located device comprises a data terminal.

61. The apparatus according to claim 55, wherein said remotely located device comprises an apparatus with more functions, thereby creating a data collection system providing expanded data handling services.

* * * * *